Figure 1:
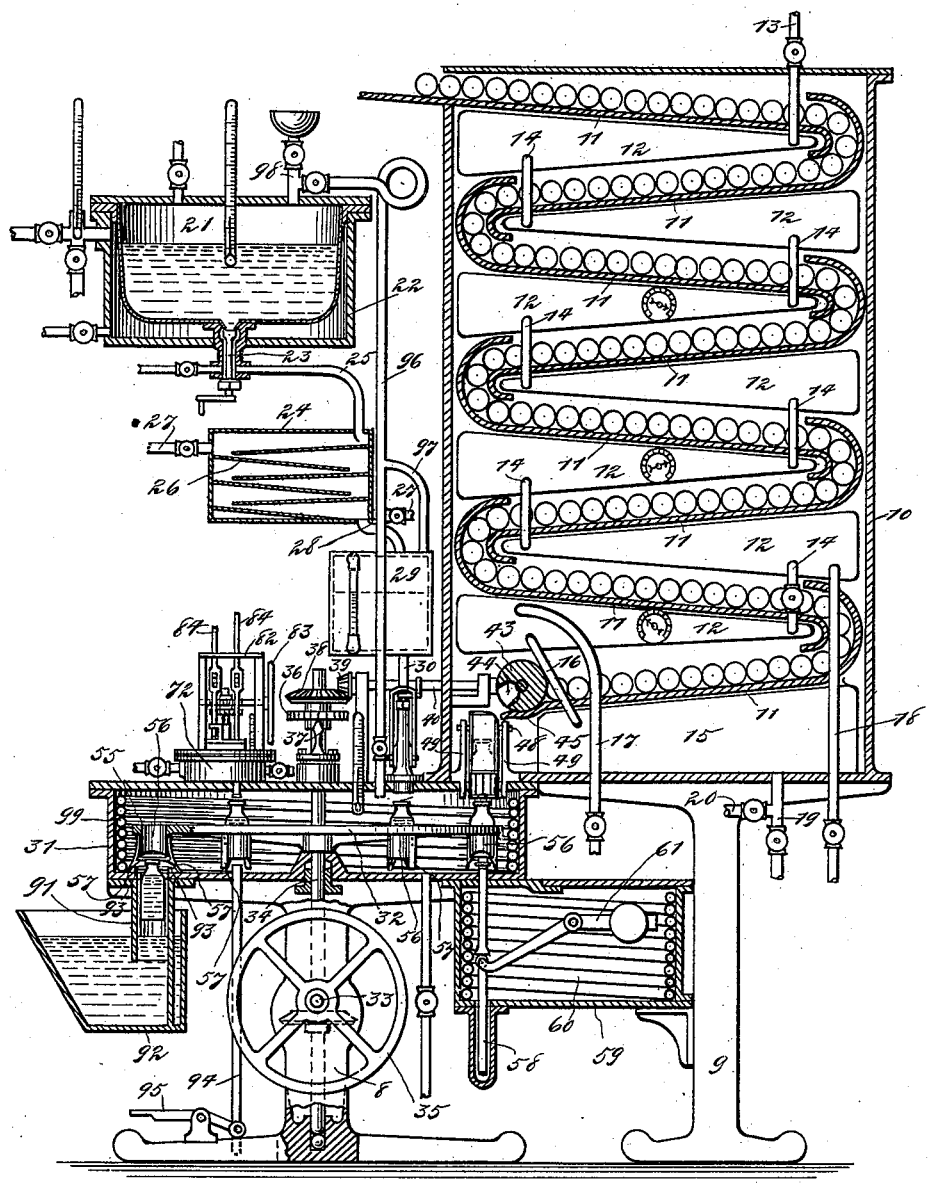

(No Model.)

A. J. VAUSE.
STERILIZING APPARATUS.

No. 599,205. Patented Feb. 15, 1898.

3 Sheets—Sheet 1.

WITNESSES:
Donn Twitchell
Isaac Bruf

INVENTOR
A. J. Vause
BY
Murray
ATTORNEYS.

(No Model.) 3 Sheets—Sheet 2.
A. J. VAUSE.
STERILIZING APPARATUS.
No. 599,205. Patented Feb. 15, 1898.
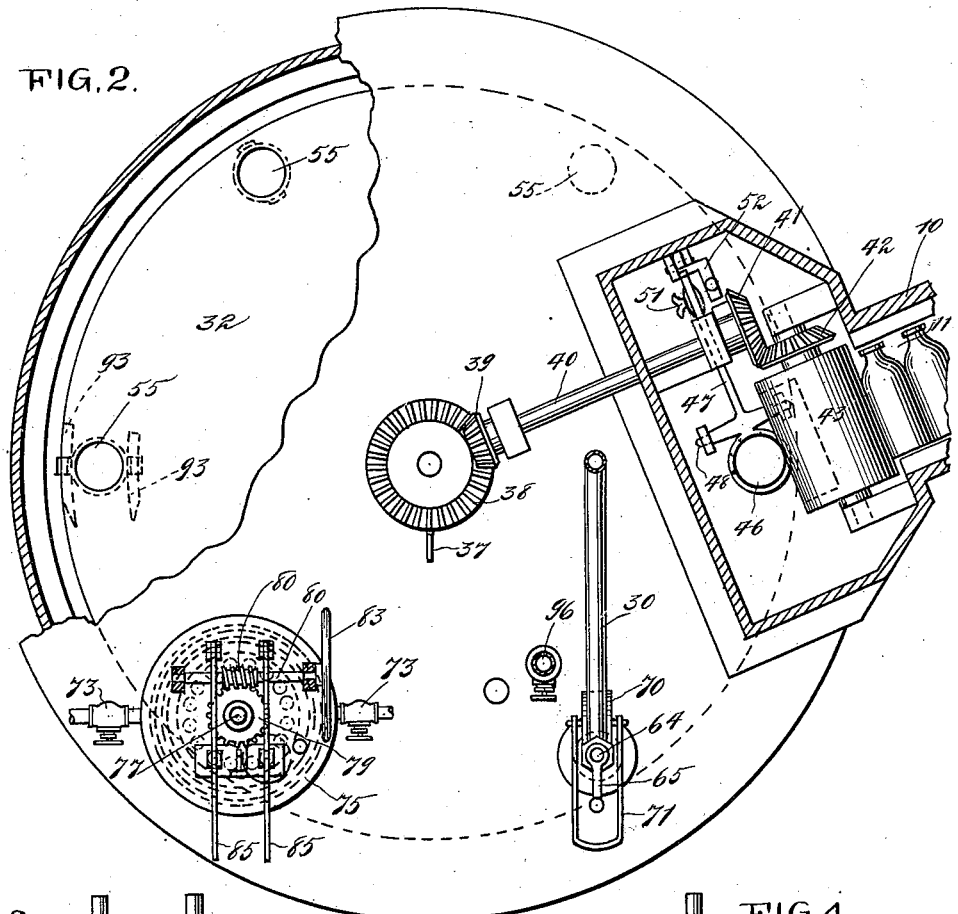
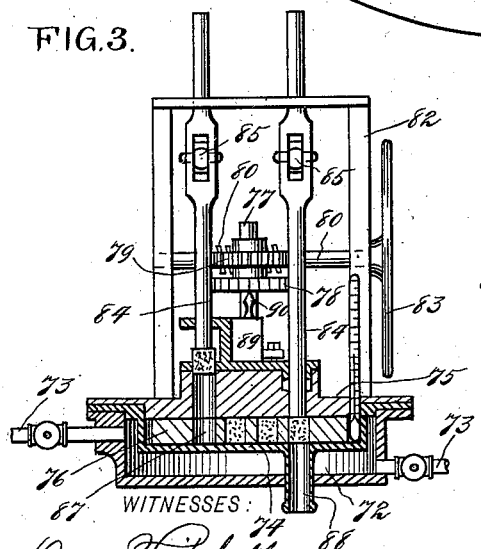
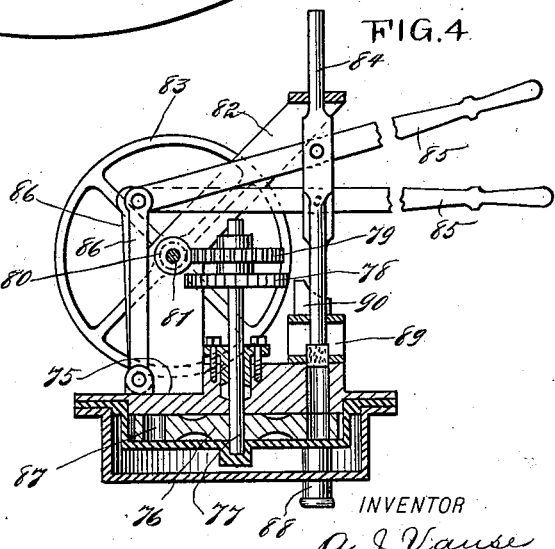
WITNESSES: Donn Twitchell, Isaac Bruf.
INVENTOR A. J. Vause
BY
ATTORNEYS.

(No Model.) 3 Sheets—Sheet 3.
A. J. VAUSE.
STERILIZING APPARATUS.
No. 599,205. Patented Feb. 15, 1898.
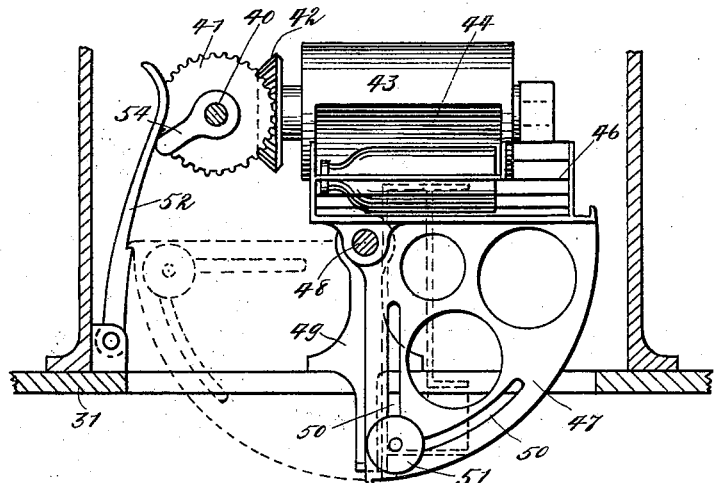
FIG. 5.
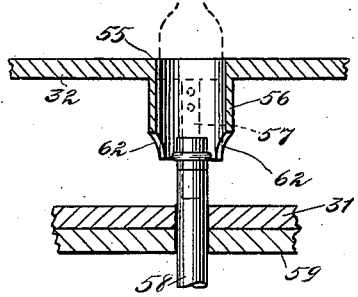
FIG. 6.
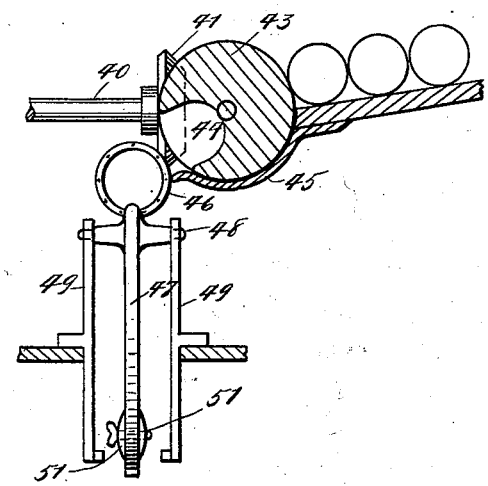
FIG. 7.
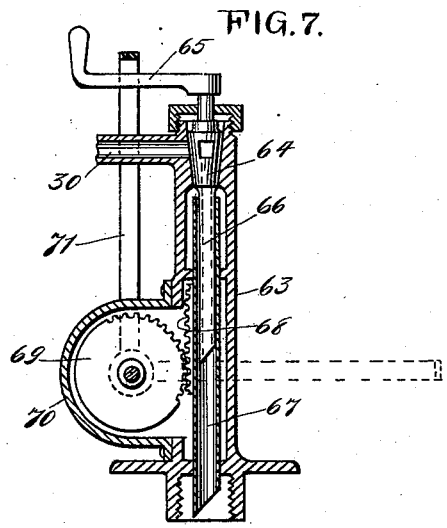
WITNESSES:
Donn Twitchell
Isaac Orr
INVENTOR
A. J. Vause.
BY
Munn
ATTORNEYS.

United States Patent Office.

ARTHUR J. VAUSE, OF SYDNEY, NEW SOUTH WALES.

STERILIZING APPARATUS.

SPECIFICATION forming part of Letters Patent No. 599,205, dated February 15, 1898.

Application filed June 9, 1896. Serial No. 594,872. (No model.) Patented in South Australia April 21, 1896, No. 3,227; in Tasmania April 21, 1896, No. 1,593; in West Australia April 29, 1896, No. 882, and in England May 28, 1896, No. 11,637.

*To all whom it may concern:*

Be it known that I, ARTHUR JOHN VAUSE, residing at Bay View House, Tempe, near Sydney, in the Colony of New South Wales, have invented a Sterilizing Apparatus, (for which I have obtained Letters Patent in England, dated May 28, 1896, No. 11,637; in Tasmania, dated April 21, 1896, No. 1,593; in West Australia, dated April 29, 1896, No. 882, and in South Australia, dated April 21, 1896, No. 3,227;) and I do hereby declare the following to be such a full, clear, and exact description of the invention as will enable others skilled in the art to which it appertains to make and use the same.

This apparatus is for sterilizing milk and other liquids and for sterilizing the receptacles in which the milk is placed, as well as for automatically bottling and corking the milk.

This specification is the disclosure of one form of my invention, while the claims define the actual scope of the invention.

Reference is to be had to the accompanying drawings, forming a part of this specification, in which similar characters of reference indicate corresponding parts in all the figures.

Figure 1 is a vertical section taken through the apparatus. Fig. 2 is a horizontal section taken just above the bottling and corking table and illustrating the machine with a portion of said table broken away. Fig. 3 is a vertical section taken through the corking apparatus. Fig. 4 is a similar view taken on the line at right angles to the line of Fig. 3. Fig. 5 is an elevational view of the apparatus for transferring the bottles from the feed-chute to the filling and corking table. Fig. 6 is a sectional view of said apparatus, and Fig. 7 is a vertical section of the bottle-filling device.

The machine is supported on two pedestals 8 and 9. Other supports may be provided, as desired, for certain hereinafter-described elements of the invention, which elements may be not conveniently supported from the pedestals 8 and 9. The pedestal 9 carries a vertically-elongated main sterilizing vessel or barrel 10, provided with a series of inclined tracks or ways 11, between which are located heating-chambers. The upper chamber 12 is fed with steam or other heating medium by a tube 13, while the remaining chambers 12 are placed in communication with each other by short tubes 14. At the bottom of the barrel 10 a chamber 15 is located. This chamber communicates with the lowermost chamber 12 by a tube 16. The lowermost chamber 12 may be emptied by a valved tube 17, which passes therefrom, while the chamber 12, immediately above it, may also be emptied by a valved tube 18. The tube 14 between the two lowermost chambers 12 is valved, so that the upper chamber of these two may be cut out of communication with the lower chamber. This is for the purpose of cooling the lowermost chamber 12 and the chamber 15, which is effected by introducing a stream of cold water through the pipe 20, forming a branch of the pipe 19. This water is forced under pressure into the chamber 15, and thence into the lowermost chamber 12, from which it escapes by means of the tube 17. The bottles are introduced to the barrel 10 and permitted to roll along the ways 11, so as to be fed to the filling and corking table, as will be more fully described hereinafter.

The milk or other liquid to be bottled is fed to a container 21. The container 21 is inclosed by a steam-jacket 22, whereby the milk is heated for sterilization. The jacket 22 and the attached parts may be supported by any approved device. The milk is withdrawn from the container by means of a valve 23 and passed into a deodorizer 24 through a tube 25. The deodorizer consists in a chamber having a series of inclined trays 26. The trays may be covered with any suitable deodorizing agent, such as carbonized paper, and the deodorizer is provided with inlet and outlet pipes 27, by means of which a current of sterilized air may be passed over the trays, so as to receive the odor of the milk acquired by the process of sterilization in the container 21. From the deodorizer 24 a tube 28 leads to a chamber 29 for containing the sterilized milk. Then the milk passes from the chamber 29 by means of a tube 30 to the filling apparatus, which will be described more fully hereinafter.

Supported on the pedestal 8 is a circular chamber 31, within which is mounted to turn a table 32. The table 32 is carried on a stem 34, running through the pedestal 8 and bearing therein. A stub-shaft 33 is mounted horizontally in the pedestal and geared with the stem 34, whereby to turn the stem 34. A handwheel 35 is attached to the shaft 33 to operate the same. The stem 34 projects up above the chamber 31 and carries a graduated disk 36, against which a stationary pointer 37 reads, so as to indicate the degrees of revolution imparted to the stem 34.

The table 32 is designed to receive the bottles from the barrel 10 and to carry the same around in the chamber 31, allowing the necessary operations to be performed. I will now describe the device for taking the bottles from the barrel 10 and depositing them on the table 32. Fixed to the upper end of the stem 34 is a bevel-gear 38, meshing with the gear 39, fixed on the horizontal shaft 40, revolubly mounted above the chamber 31 and extending into the barrel 10. The end of the shaft 40 that is within the barrel 10 has a bevel-gear 41 secured thereto. This gear meshes with a gear 42, fixed on the axis of a cylinder 43. The cylinder 43 is mounted in a position at right angles to the shaft 40 and has a longitudinally-extending orifice 44, capable of receiving a single bottle. The cylinder 43 is arranged over a slightly-depressed plate 45, rigidly secured to or forming part of the lowermost way 11.

The revolution of the shaft 40 revolves the cylinder 43, and this takes within the recess 44 thereof one of the bottles, turning the bottle over and delivering the same within a cage 46, which is rigidly secured to one radial edge of a quadrant 47, mounted on an axis 48 and supported by brackets 49, in turn supported by the framing of the chamber 31. The cage 46 is cylindrical in form and has its upper portion broken away at one side, so that the bottle may be placed therein by delivery from the cylinder 43. The outer portion of the cage 46 is not broken at the sides, but the outer end of the cage is bottomless, so that as the quadrant drops to the position shown by dotted lines in Fig. 5 the bottle within the cage may slide downward and out thereof. The quadrant 47 has two slots 50, one running radially and the other running circumferentially. In these slots a weight 51 is adjustable. The weight 51 serves to hold the quadrant in the position shown in Fig. 5. The quadrant is held in the position shown by dotted lines in Fig. 5 by means of a dog 52, pivotally mounted on the top of the chamber 31 and provided with a notch engaged by a projection 53, formed on the quadrant. A tappet 54, fixed to the shaft 40, swings into engagement with the dog 52, so as to move the same leftward (see Fig. 5) and disengage the projection 53 with the shoulder on the dog. This releases the quadrant and permits the same to swing to the position shown by full lines in Fig. 2. As the quadrant is released the cylinder 43 is turned to revolution and a bottle is deposited into the cage 46; but the weight of the bottle immediately preponderates the action of the weights 51 and throws the quadrant back to the position shown by dotted lines in Fig. 5, so that the bottle slides from the cage and the devices are ready for the delivery of a second bottle.

The table 32 is provided with five or more openings 55. As shown in Figs. 1 and 5, each opening 55 is provided with a downwardly-projecting case 56. These cases are capable of receiving the bottles, and the bottles are held by spring-dog 57, secured to the outer sides of the cases and having spurs projecting inward to engage the bottom of the respective bottles. The table 32 is so disposed relatively to the quadrant 47 that as the quadrant drops under the weight of a bottle the bottle will be projected into one of the openings 55 and held by the corresponding case 56 and dogs 57. Directly below the vertical position of the cage 46 is arranged a vertically-reciprocal rod 58. This rod 58 extends through the bottom of the chamber 31 into a subjacent chamber 59, which, if desired, may be provided with a heating-coil 60. By these means the rod 58 may be kept hot and the complete sterilization of the liquid insured. The chamber 59, while not absolutely essential, is still desirable. The rod 58 is given an upward tendency by means of a weighted lever 61. This rod 58 is arranged so that the table 32 will stop with one of its openings 55 directly above the rod. Each case 56 is provided at points separate from the spring catches or dogs 57 with recesses 62, which permit the rod 58 to extend up above the catches 57. Now as the bottle drops into the case 56 the rod 58 is engaged and the force of the downward movement of the bottle is stopped, so that the bottle is seated easily upon the catches or dogs 57.

The bottles having been delivered to the table from the barrel 10 are passed around with the table to a point beneath the filling apparatus, whereupon the table is again stopped and the filling operation performed. The filling apparatus consists in a tubular column 63, standing on the top of the chamber 31 and communicating with the interior thereof. To this column 63 the pipe 30 from the chamber 29 leads, and the passage of the milk from the pipe 30 to the column 63 is controlled by a valve 64, having a crank-handle 65, located above the column 63. The plug of the valve 64 is provided with a tubular extension 66, projecting down into the column. Sliding on the tubular extension 66 is a tube 67, that is contained within the column 63 and that is intended to be projected downward into the chamber 31 to the mouth of the bottle, so as to lead the milk to the bottle. The tube 67 has a rack 68 engaged by a gear 69, held in a casing 70, forming part of the column 63. A U-shaped rod 71 is attached to the axis of the gear 69, so as to turn the gear a quarter of a revolution, whereupon the tube 67 will be projected downward in position to lead the milk directly to the bottle. When, therefore, the bottle reaches a point beneath the column 63, the rod 71 is pulled down to throw downward the tube 67, and next the valve 46 is opened to permit a stream of milk to pass into the bottle. When the bottle has been filled, the valve 64 is closed and the rod 71 raised. From the filling apparatus the bottle passes, with the table 32, around to the corking apparatus. This will now be described. The corking apparatus is situated on top of the chamber 31 and consists in a cylindrical casing 72, provided with inlet and outlet pipes 73, by which a sterilizing fluid may be passed into the casing. A pan 74 is situate within the casing 72 and held therein, as well as closed, by means of a cap 75, secured down on the casing 72. The pan 74 contains a disk 76, carried on a spindle 77, which projects through the cap 75 and is provided with a graduated index-wheel 78 and a worm-wheel 79. The worm-wheel 79 meshes with a worm 80, carried on a shaft 81, mounted horizontally in a frame 82 and provided with a hand-wheel 83, by which the shaft 81 may be turned. The frame 82 is overhung forward, so as to carry two vertically-reciprocal pluggers 84. These pluggers are respectively operated by hand-levers 85, passing through openings in the pluggers and supported, respectively, by links 86, to which links the levers are pivoted, and the links being in turn pivoted to the cap 75. The pluggers 84 pass through the cap 75, and one is capable of projecting directly above the disk 76, while the other is capable of projecting down through orifices 87 in the disk and into a conductor-tube 88, passing from an opening in the pan 74 downward through the casing 72 and into the chamber 31. The openings 87 in the disk 76 are designed to receive the corks, which are placed in position by means of the left-hand plugger 84. (Shown in Fig. 3.) For this purpose a holder 89 is secured to the top of the cap 75 and arranged to have the said left-hand plugger moved through it. The holder 89 primarily receives the cork, and the downward movement of the corresponding plugger passes the cork from the holder through the cap 75 into one of the orifices in the disk 76. By means of the hand-wheel 83 and the mechanism operated therefrom the disk 76 may be turned so as to place the several orifices with their corks successively beneath the right-hand plugger 84. (Shown in Fig. 3.) Then upon the operation of this plugger the corks are forced from the disks 76 downward into the tube 88 and into the mouth of the bottle, which bottle is held beneath the tube 88 by the devices before described. The corks are sterilized within the pan 74, which is heated by the sterilizing fluid contained in the casing 72. The graduated wheel 78 is juxtaposed to an indicator 90, whereby the disk of revolution of the shaft 77, and consequently the position of the disk 76, may be determined.

In order to hold the bottles firmly during the corking operation and to raise them to engagement with the tube 88, I provide a vertically-reciprocal rod 94, passing into the chamber 31 and pivoted to a treadle 95, mounted on the base of the pedestal 8. The operator upon the manipulation of the plugger 84, which drives home the cork, should simultaneously depress the treadle 95, whereupon the rod 94 will be raised to engage the bottom of the bottle and elevate it to the tube 88.

After the table 32 has been turned from the corking apparatus the entire operation of the machine will have been completed, the milk will be placed within the bottles, and the bottles will have been corked. It therefore is next necessary to deliver the bottles from the chamber 31. For this purpose the chamber is provided with an opening from which a tube 91 downwardly projects into a vat or tank 92, containing lime-water or other suitable antiseptic. As each case 56, with its dogs or catches 57, passes over the tube 91 the dogs or catches are engaged with cam-shaped cleats 93, secured to the upper face of the bottom of the chamber 31. By means of these cleats the catches 57 are spread apart and the bottle is relieved of its support, so that it will drop downward through the tube 91 into the tank 92. These cleats 93 are shown by full lines in Fig. 1 and by dotted lines in Fig. 2.

The apparatus is provided at various points with suitable thermometers to indicate the thermal conditions of the apparatus. Also to insure the free flow of liquids an air-tube 96, with branches 97 and 98, is provided, so that the several closed chambers may have such circulation of air as will permit the liquid to flow. The chamber 31, being a sterilizing-chamber, is provided with a coil 99, by which it may be heated.

Having thus described my invention, I claim as new and desire to secure by Letters Patent—

1. In an apparatus for sterilizing and bottling liquids, the combination of a sterilizing vessel, an inclined way therein on which the receptacles for the liquid are placed to be sterilized, a sterilizing-chamber beneath the barrel, a disk revolubly mounted in the chamber and capable of carrying the said receptacles, means for transferring said receptacles from the inclined way to the disk, a valve-controlled conductor for carrying the liquid to the said receptacles and through the walls of the sterilizing-chamber, and a plugger mounted above the walls of the sterilizing-chamber and capable of moving through the same, whereby to cork the said receptacles.

2. In an apparatus for sterilizing and bottling liquids, the combination of a sterilizing vessel, an inclined way therein, the way being capable of holding receptacles to be sterilized, a revoluble cylinder mounted at the lower end of the inclined way and having a recess capable of receiving one of the receptacles, a pivotally-mounted quadrant having a rack capable of receiving the receptacles from the cylinder, a sterilizing-chamber into which the rack of the quadrant delivers, and a carrier revolubly mounted within said sterilizing-chamber and receiving the said receptacles from the rack of the quadrant.

3. The combination of an inclined way, a cylinder mounted to turn at the lower end thereof and having a recess in its side, a quadrant mounted to swing below the cylinder, and a rack carried on the quadrant and capable of receiving a vessel from the cylinder.

4. The combination of a revoluble cylinder having a recess in one side thereof, a quadrant pivotally mounted adjacent to the cylinder, a rack attached to the quadrant and normally held horizontally alongside of the cylinder, a dog capable of holding the quadrant with the rack in a vertical position, and a tappet geared with the cylinder and serving to actuate the rack to periodically release the quadrant.

5. The combination of a revolubly-mounted cylinder, having a recess in the side thereof, a quadrant pivotally mounted adjacent to the cylinder, a rack carried by the quadrant and receiving a vessel from the recess in the cylinder, a bottomless case supported vertically beneath the quadrant and capable of receiving the said vessel from the rack thereof, and a balanced rod movable vertically in the lower portion of the case to be engaged by said instrument and receive the blow thereof.

6. The combination of a revolubly-mounted cylinder having a recess in the side thereof, a quadrant mounted adjacent to the cylinder, a rack carried by the quadrant and capable of receiving a vessel from the recess in the cylinder, the quadrant normally holding the rack horizontally, a dog capable of engaging the quadrant to hold the rack vertical, and means for automatically releasing the dog.

7. The combination of a pan, having an opening therein, a disk revolubly mounted on the pan and having a plurality of openings, each capable of registering with the opening in the pan, and two pluggers mounted above the disk, one of said pluggers being capable of passing through and below the disk and the other of said pluggers being capable of moving down to the disk.

8. The combination of a sterilizing-chamber, a pan seated within the sterilizing-chamber, a cap bearing down on and inclosing the pan, the cap having two vertical passages therein, a plugger moving through each passage, and a disk revolubly mounted in the pan, the disk having a series of openings, each capable of registering with each opening in the cap, and the pan having an opening in its bottom with which each of the openings in the disk is capable of registry, one of the pluggers serving to place the corks within the openings in the disk and the other of the pluggers serving to drive the corks from said openings.

9. The combination of a sterilizing-casing, a pan situated within the casing, a cap bearing down on and inclosing the same, the pan having an opening in its bottom, and a tube run from said opening through said sterilizing-chamber, a disk revolubly mounted in the pan and having a series of openings each capable of registering with the opening in the pan, a frame standing on the cap, two pluggers mounted to move vertically in the frame and through the cap, one of the pluggers registering with the opening in the bottom of the pan, a shaft attached to the disk and passing through the cap to revolubly mount the disk, a worm-wheel attached to the shaft, and a worm mounted in the frame and meshing with the worm-wheel whereby to turn the disk.

10. The combination with walls forming a sterilizing-chamber, one of said walls having a discharge-opening therein, of a cam-shaped cleat carried by said wall adjacent to the discharge-opening, a revoluble carrier mounted within the sterilizing-chamber, and a spring-pressed dog supported on the carrier, and engaging the cleat as the dog moves over the said opening.

11. The combination of walls forming a sterilizing-chamber, a disk mounted to revolve within the sterilizing-chamber, a case carried by the disk, a spring-pressed dog supported on the case and located at the bottom thereof, and a cleat secured to one of said walls and engaged by the dog to retract the dog.

12. In an apparatus for sterilizing and bottling liquids, a vessel having devices for supporting and sterilizing the liquid-receptacles, a jacketed container for the liquids, a sterilizing-chamber, a carrier within the chamber and receiving the said receptacles from the barrel, a valve-controlled filling device conducting the liquid to the sterilizing-chamber, and a corking device located above the sterilizing-chamber and capable of forcing the corks into the same to close the receptacles held on the carrier.

13. In a sterilizing apparatus, the combination of an inclined way, a recessed cylinder located adjacent to said way and capable of taking a vessel from the way, a swinging quadrant having a rack receiving the vessel from the cylinder, and a vertically-movable balanced rod on the upper end of which the vessel is delivered from the rack by the gravity of the vessel.

14. The combination of an inclined way, a recessed cylinder operating at the lower end of said way and capable of taking a vessel therefrom, a swinging quadrant having a rack receiving the vessel from the cylinder, a revoluble table located beneath the quadrant and having a seat for the vessel, and a balanced rod located beneath the table and quadrant, the table being adjusted to place the seat beneath the quadrant so that the vessel falling from the rack will engage the rod and be seated in the table.

15. The combination of an inclined way, means at the lower end of said way for taking a vessel from the way and dropping the vessel in perpendicular position, a balanced rod the upper end of which is engaged by the vessel when dropped whereby to arrest the vessel, and a revoluble table interposed between the rod and said means and having a seat for receiving and carrying the vessel.

16. The combination of a hollow column, a valve mounted in the column and controlling an orifice in the upper end thereof, the valve having a tubular extension running down through the column, a tube slidable on the tubular extension of the valve, and gearing for reciprocating said tube to move the same in and out of the column.

17. The combination with an inclined way, of a cylinder revolubly mounted at the lower end thereof and having a recess therein, such recess being capable of receiving a vessel from the way, a quadrant mounted adjacent to the cylinder and having a rack capable of receiving the vessel from the recess as the cylinder turns, the quadrant being arranged to hang with said rack adjacent to the cylinder and to be swung from said position by the weight of the vessel, a dog capable of holding the quadrant out of normal position, and a tappet geared with the cylinder and serving to move the dog to release the quadrant.

18. The combination with an inclined way, of a recessed cylinder revolubly mounted at the lower end thereof, gearing for driving said cylinder, a tappet in connection with said gearing, a dog engaged perpendicularly by the tappet, a swinging quadrant juxtaposed to the cylinder and having a rack capable of receiving a vessel from the recess in the cylinder, and a weight adjustable on the quadrant and serving to normally hold the quadrant with the rack juxtaposed to the cylinder, the weight on the quadrant being preponderated by said vessel whereby the quadrant is swung from its normal position to engagement with the dog.

19. The combination with a means capable of holding and expelling a vessel, of a swinging quadrant mounted adjacent thereto, and a rack on the quadrant capable of receiving the vessel when expelled from said means, the quadrant being arranged to normally hang with the rack juxtaposed to said member.

20. The combination with a casing and a pan bearing in the casing, the pan having a conductor-tube running downward through the bottom of the casing, of a revoluble disk mounted in the casing, gearing for manually turning the disk, the disk having a series of orifices therein, a cap bearing down on the disk and inclosing the same, and two pluggers working through the cap and disk, one of said pluggers being capable of affixing corks in the orifices of the disk and the other of said pluggers being capable of driving the corks through the conductor-tube.

21. The combination of an inclined way, a sterilizing vessel inclosing said way, a sterilizing-chamber, a table revoluble within said chamber, means for delivering vessels from the inclined way to the table, gearing by which the table may be revolved, a liquid-supply apparatus leading into said second sterilizing-chamber to fill the vessels, and a corking apparatus mounted on the said second sterilizing-chamber and driving corks into the vessels.

Dated this 7th day of April, 1896.

A. J. VAUSE.

Witnesses:
  G. A. BROWN,
  L. MUSGRAVE.